United States Patent
Dore et al.

(10) Patent No.: US 11,693,538 B2
(45) Date of Patent: Jul. 4, 2023

(54) METHOD FOR ACTIVATING A MOBILE DEVICE IN A NETWORK, AND ASSOCIATED DISPLAY DEVICE AND SYSTEM

(71) Applicant: INTERDIGITAL MADISON PATENT HOLDINGS, SAS, Paris (FR)

(72) Inventors: Renaud Dore, Rennes (FR); Vincent Demoulin, Montfort sur Meu (FR); Frederic Plissonneau, Thorigne-Fouillard (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 418 days.

(21) Appl. No.: 14/652,447

(22) PCT Filed: Dec. 16, 2013

(86) PCT No.: PCT/EP2013/076660
§ 371 (c)(1),
(2) Date: Jun. 15, 2015

(87) PCT Pub. No.: WO2014/095691
PCT Pub. Date: Jun. 26, 2014

(65) Prior Publication Data
US 2015/0324077 A1    Nov. 12, 2015

(30) Foreign Application Priority Data

Dec. 17, 2012 (FR) ..................................... 1262179

(51) Int. Cl.
*G06F 3/0484* (2022.01)
*H04L 67/02* (2022.01)
(Continued)

(52) U.S. Cl.
CPC ............ *G06F 3/0484* (2013.01); *G06F 3/017* (2013.01); *G06F 3/0304* (2013.01);
(Continued)

(58) Field of Classification Search
CPC ...... G06F 3/0346; G06F 15/16; G06F 3/0484; G06F 3/0304; G06F 3/017; H04L 67/16; H04L 67/02; H04L 41/0806; H04W 8/005
See application file for complete search history.

(56) References Cited

U.S. PATENT DOCUMENTS

| 8,230,075 B1 | 7/2012 | Westkamp et al. |
| 8,447,863 B1 * | 5/2013 | Francis, Jr. ............. H04W 4/02 709/226 |

(Continued)

FOREIGN PATENT DOCUMENTS

| JP | 2008305059 | 12/2008 |
| JP | 2011044040 | 3/2011 |

(Continued)

OTHER PUBLICATIONS

Search Report dated Dec. 5, 2013.

*Primary Examiner* — Daniel W Parcher

(57) ABSTRACT

A method for activating a mobile device in a network is disclosed wherein the network further comprises at least one display device coupled to a sensor. This method comprises:
  detecting the mobile device via the sensor coupled to the display device;
  displaying a virtual device representative of the detected mobile device on the display device such that the position of the virtual device on the display device is linked to the position of the mobile device in the capture field of the sensor;
  activating the mobile device in the network when a determined action is applied by the user to the mobile device.

(Continued)

A display device and a system implementing the method are further disclosed.

20 Claims, 2 Drawing Sheets

(51) Int. Cl.
  H04L 41/0806 (2022.01)
  H04W 8/00 (2009.01)
  G06F 3/03 (2006.01)
  G06F 3/01 (2006.01)
  G06F 3/0346 (2013.01)
  H04L 67/51 (2022.01)

(52) U.S. Cl.
  CPC ........ *G06F 3/0346* (2013.01); *H04L 41/0806* (2013.01); *H04L 67/02* (2013.01); *H04L 67/51* (2022.05); *H04W 8/005* (2013.01)

(56) References Cited

U.S. PATENT DOCUMENTS

| | | | | |
|---|---|---|---|---|
| 8,699,779 | B1 * | 4/2014 | Prasad | G06K 9/32 |
| | | | | 382/137 |
| 8,988,556 | B1 * | 3/2015 | Karakotsios | H04N 5/23229 |
| | | | | 348/116 |
| 2001/0044858 | A1 * | 11/2001 | Rekimoto | G06F 3/011 |
| | | | | 710/1 |
| 2007/0003061 | A1 | 1/2007 | Jung et al. | |
| 2008/0214233 | A1 * | 9/2008 | Wilson | H04M 1/7253 |
| | | | | 455/556.1 |
| 2009/0208052 | A1 * | 8/2009 | Kaplan | G06F 3/011 |
| | | | | 382/103 |
| 2010/0141578 | A1 | 6/2010 | Horiuchi et al. | |
| 2010/0214243 | A1 * | 8/2010 | Birnbaum | G06F 3/016 |
| | | | | 345/173 |
| 2010/0225580 | A1 * | 9/2010 | Yoon | G06F 3/038 |
| | | | | 345/157 |
| 2011/0047458 | A1 | 2/2011 | Toledano et al. | |
| 2011/0058711 | A1 | 3/2011 | Noda et al. | |
| 2011/0157012 | A1 | 6/2011 | Ma et al. | |
| 2011/0188483 | A1 * | 8/2011 | Lee | H04M 1/7253 |
| | | | | 370/338 |
| 2011/0273368 | A1 * | 11/2011 | Hinckley | G06F 3/038 |
| | | | | 345/156 |
| 2011/0314153 | A1 | 12/2011 | Bathiche et al. | |
| 2011/0314168 | A1 | 12/2011 | Bathiche et al. | |
| 2013/0339864 | A1 * | 12/2013 | Uusitalo | H04W 48/18 |
| | | | | 715/736 |
| 2014/0007211 | A1 | 1/2014 | Yang et al. | |
| 2014/0064736 | A1 | 3/2014 | Manabe | |

FOREIGN PATENT DOCUMENTS

| | | |
|---|---|---|
| JP | 2011054117 | 3/2011 |
| JP | 2014010833 | 1/2014 |
| JP | 2014053667 | 3/2014 |

* cited by examiner

METHOD FOR ACTIVATING A MOBILE DEVICE IN A NETWORK, AND ASSOCIATED DISPLAY DEVICE AND SYSTEM

This application claims the benefit, under 35 U.S.C. § 365 of International Application PCT/EP2013/076660, filed Dec. 16, 2013, which was published in accordance with PCT Article 21(2) on Jun. 26, 2014 in English and which claims the benefit of French patent application No. 1262179, filed Dec. 17, 2012.

TECHNICAL FIELD OF THE INVENTION

The invention relates to the technical field of communication networks. More specifically, the invention relates to a method for activating a mobile device in a network comprising at least one display device.

PRIOR ART

A home network, a local network (LAN) or more generally a communication network comprises devices capable of communicating with each other via the network. As a non-restrictive example, a device of a home network is a personal computer, a connected television set, an access modem, a digital decoder, a mobile telephone (possibly of "smartphone" type), a Personal Digital Assistant (PDA), an electronic tablet, a games console or a wireless keyboard.

In addition, it is noted that mobile devices such as smartphones participate increasingly actively in the home network. It can thus be noted that the mobile telephone serves as a remote control for devices of the network such as the television set or the decoder, and serves as a source or as storage for audio and/or video content. A user can initiate an action on a specific device of the home network from the mobile telephone: for example the streaming on a screen of the network of a video from the mobile telephone, the display on the screen of the contacts list of the telephone and/or of the network, the download of a film on the server at home, etc.

To participate thus in the home network, the mobile telephone must be logically linked to the home network, that is to say be inserted into the network, have the access rights and be recognised as being present. Several problems therefore occur for users who lack information on the recognition of their mobile telephone by the other devices of the network. During the first connection to the network, the mobile telephone must be identified in order to obtain the rights necessary for its insertion into the network. A connection can also be temporary or one-time, for example limited to a single connection: this is the case for the telephone of a guest user in the house, comprising an item of video content which the guest user wishes to display on a screen in the house. Finally, once the mobile telephone is inserted into the home network, in order to be able to initiate and action, the user sorely lacks information on the status of the telephone as seen by the network: is the telephone present? Is the telephone preparing an action on the home network? Often, the various applications on the network are accessible from the menus of the telephone. Numerous applications on the telephone use a graphical interface and control commands which are simple and intuitive from the users perspective, for example via a touch screen. For this reason, actions commanded by gesture are preferable in terms of user-friendliness, as opposed to, for example, a multiple-choice menu on the mobile telephone.

In addition, the latency time of the entry of the command, that is to say the time between the action of the user and the result, is often significant. For example, if the mobile telephone communicates with the network using a wireless technology of Wi-Fi or NFC type, when the user moves his mobile telephone near to a screen of the network in order to enter a command, the time of detection of the mobile by the screen then of execution of an action so that it is visible on the screen is not instantaneous and the user is often left waiting for the return signals, making the device not particularly user-friendly. This problem is specific to wireless devices which by their nature are mobile. The user does not always know what their status in the network is, for example whether they are present or absent. The lack of information on the progress of the action commanded by the user via the mobile device, between the time of the command and the time of the action, is therefore particularly disruptive. A frequent problem with network technology is therefore that the user does not see immediately the result of what he is doing. He observes the result of his action sometimes tens of seconds after his actions: he sorely lacks intermediary signals alerting him to the progress of his action.

A solution would therefore be desirable to the problem of activating a mobile device in a network comprising a signalling which informs the user of the progress status of his action.

SUMMARY OF THE INVENTION

The purpose of the invention is therefore to improve the situation, and more specifically to make the introduction of an action by a mobile device intuitive and user-friendly.

For this purpose, the invention notably proposes a method for activating a mobile device in a network comprising at least one display device, the display device being coupled to a sensor. This method is characterised by the fact that it comprises:
  a step of detecting the mobile device via the sensor coupled to the display device,
  a step of continuously displaying a device representative of the detected mobile device, called a virtual device, on the display device in response to the displacement of the detected mobile device by a user such that the position of the virtual device on the display screen is linked to the position of the mobile device in space,
  a step of activating the mobile device in the network when a determined action is applied by the user to the mobile device.

The method according to the invention can comprise other characteristics that can be taken individually or in combination, and notably:
  the sensor comprises at least one camera configured to capture at least one image;
  the step of detecting the mobile device comprises an object recognition step associating a determined shape with the mobile device and wherein the virtual device is representative of the determined shape.
  the step of detecting the mobile device comprises a step of determining the relative position of the mobile device with respect to the display device.
  the step of detecting the mobile device comprises a step of determining the relative orientation of the mobile device with respect to the display device;
  the determined action of the activation step is the displacement of the mobile device so that the virtual device is displaced to a link area on the display device;

the determined action of the activation step is the pressing of a determined area on the mobile device;

the determined action of the activation step is a determined movement applied by the user to the mobile device;

the network further comprises at least one second device and the activation step further comprises the entry of a command on the display device or on the second device.

the detection step is initiated by a preliminary detection step in a wireless communication field.

The invention also proposes a display device implementing the method according to one of the preceding claims.

Such a network display device can be, for example, in the form of a dedicated screen fixed to a wall of the house, a connected television set or an electronic tablet on a support device connected by a wired link to the network.

The display device configured to activate a mobile device in a network is characterised by the fact that it comprises:

a sensor configured to detect the mobile device;
an object recognition module configured to recognise the detected mobile device;
a module for calculating a relative position of the detected mobile device with respect to the display device;
a module for synthesising a device representative of the detected mobile device, called a virtual device, on the display device configured to reproduce a relative position of the virtual device on the display device according to the relative position of the mobile device;
a module for activating the mobile device in the network when a determined action is applied by the user to the mobile device.

The invention also proposes a system implementing the method according to one of the preceding claims. The system for activating a mobile device in a network is characterised in that it comprises:

a display device;
a mobile device;
a sensor coupled to the display device;
an object recognition module configured to recognise the detected mobile device;
a module for calculating a relative position of the detected mobile device with respect to the display device;
a module for synthesising a device representative of the detected mobile device, called a virtual device, on the display device configured to reproduce a relative position of the virtual device on the display device according to the relative position of the mobile device;
a module for activating the mobile device in the network when a determined action is applied by the user to the mobile device.

The various modules of such a system can for example be implemented in the display device but also in a distributed way in the communication network (or "cloud").

A mobile device can, for example, be in the form of a mobile telephone, a personal digital assistant, a wireless keyboard or an electronic tablet.

BRIEF DESCRIPTION OF THE DRAWINGS

Other characteristics and advantages of the invention will appear upon examination of the detailed description hereafter, and the annexed drawings, wherein.

Figure 1:
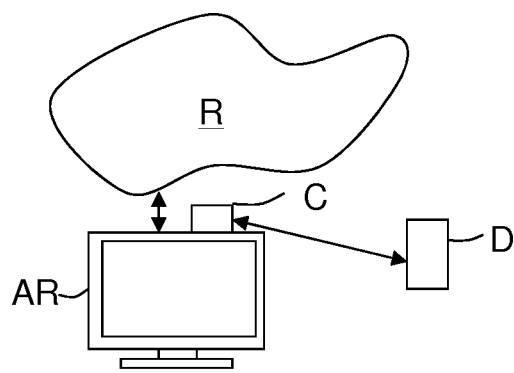
FIG. 1 shows diagrammatically and functionally a communication network equipped with a network display device in communication with a mobile device according to an embodiment of the invention.

The annexed drawings can be used not only to complete the invention, but also to contribute to its definition, if necessary.

DETAILED DESCRIPTION

The purpose of the invention is notably to propose a method for activating a mobile device D in a network R based on the use of a sensor C, for example a camera, linked to a screen ER of the network R. By activation, it is considered that the device is recognised by the network (possibly with determined rights) and that it is able to enter commands into the network. The sensor C makes it possible to implement a step of recognising, locating and orienting the mobile telephone in order to synthesise its graphical representation, called virtual device or avatar A, on the screen. Then, the user displacing his mobile telephone D in front of the screen can observe the movement of the avatar A on the screen as if the screen were a mirror. Thus, the user receives information on the recognition of his mobile telephone. By carrying out an action or a particular movement with his mobile telephone which he can observe on the screen, the user initiates an action. According to a variant, by moving the avatar A over a given area ZL represented on the screen ER the user carries out the insertion of his mobile telephone into the network, that is to say he can enter commands into the network.

Hereafter, it is considered as a non-restrictive example that the communication network R is a home network connected to the Internet network notably by an xDSL access network. The communication network R can be a wired network of cable or fibre type, or a WLAN (Wireless Local Area Network, possibly of 802.11 (or Wi-Fi) or WiMAX type) wireless local network, a very short-range wireless local network of Bluetooth type or a hybrid network. The home network can comprise, as a non-restrictive example, a personal computer, a connected television set, an access modem, a digital decoder, a mobile telephone (possibly of "smartphone" type), a Personal Digital Assistant (PDA), an electronic tablet, a wireless keyboard or a games console. But the invention is not limited to this type of home network. Indeed, it also relates to a very short-range wireless local network of Bluetooth type for example located in a car, comprising a display device and wherein the driver wishes to insert his mobile telephone.

Moreover, it is considered hereafter, as a non-restrictive example, that the mobile device D is a smartphone. But the invention is not limited to this type of device. Indeed, it also relates to any type of wireless device able to introduce an action via the mobile device and the network display using a command entry means, a remote user interface. Consequently, it can also relate to, for example, a mobile telephone of "smartphone" type, a Personal Digital Assistant (PDA), an electronic tablet, a wireless keyboard, a remote control or a games console. Hereafter, the device will be called "smartphone".

It is also considered that the network comprises a fixed display device dedicated to the network. The display device is for example a screen connected to a communication device at the core of the network such as a modem or a decoder. The display device and the communication device are directly connected by a wired (via HDMI for example) or wireless link, or via the intermediary of the home network. Being entirely dedicated to the base device of the network, and being fixed (as opposed to the mobility of a tablet or a smartphone), this fixed screen offers the user new features whose benefits will be seen in the rest of this document. Hereafter, this screen will be called "network display" AR.

A sensor is attached to the network display. Hereafter it is considered, as a non-restrictive example, that the sensor is a camera or several cameras (at least two) attached to the screen, for example on the top of the screen. But the invention is not limited to this type of sensor. Indeed, it also relates to any type of more or less sophisticated sensor making it possible to detect an object in space that is to say, according to different variants, to detect the shape of the object (for example a parallelepiped with determined areas for the keys or the screen), to determine the relative distance of the object with respect to the network display, or to determine the relative orientation of the object with respect to the network display. As non-restrictive examples, the sensor can be a camera capable of defining a depth map by being associated with a second distinct camera, with an additional item of equipment of Kinect® type (manufactured by Microsoft) or with a simple distance detector. The sensor can also be an ultrasound device configured to recognise a flat surface (the smartphone) and to determine a distance to the screen thereof or an electromagnetic relative positioning device using the transmission (and reception) of a wave of the sensor to (and from) embedded tags on the mobile device. Finally, the sensor can also comprise specific cells which themselves compose the screen and which capture an image so as to make the screen a kind of surface capture device for objects placed in front of it. Any technology known to those skilled in the art and making it possible to detect an object such as a smartphone in space, to detect the information necessary for the recognition of the object and to calculate its spatial coordinates (up to 6 coordinates) in order to synthesise its representation on the screen from the shape recognised can be considered here, and notably technologies based on emission of waves in the infra-red spectrum, of electromagnetic fields or in the ultrasonic spectrum (as in certain automobile vehicle parking assistance devices).

FIG. 1 shows diagrammatically a communication network R equipped with a network display device AR in communication with a mobile device D according to an embodiment of the invention. A sensor C is associated with the network display AR. It is understood here by "associated" both the fact of being an integral part of the network display device AR (shown in a non-restrictive manner) and the fact of being coupled directly to the device an therefore to the communication network. Advantageously certain tasks, such as object recognition, can be distributed in the local network or Internet (cloud).

Figure 2:
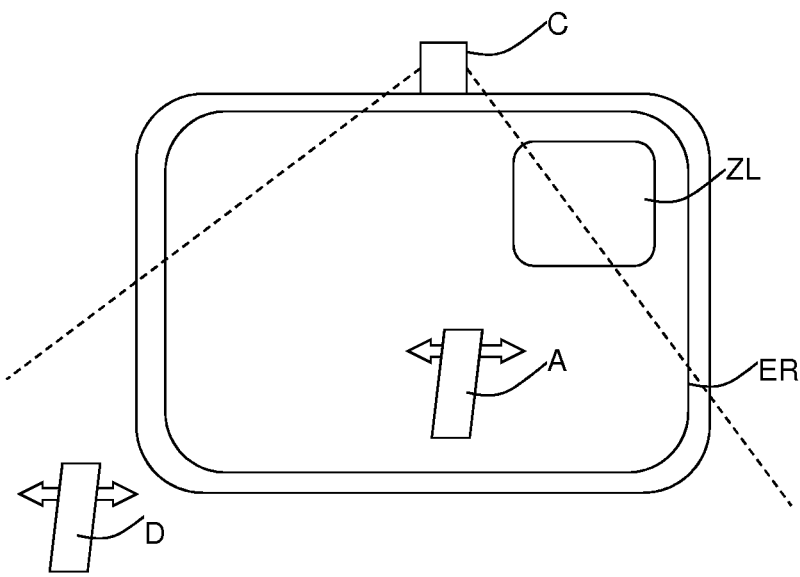
FIG. 2 shows diagrammatically a virtual device and a link area on a display device according to an embodiment of the invention.

FIG. 2 shows diagrammatically the virtual device A and a link area ZL presented on a display device AR according to an embodiment of the invention. The user holding his smartphone D displaces it in space and can thus observe as in a mirror the avatar A on the screen. According to variants, the presentation on the screen of the avatar A, but also of the content to be displayed or the link area ZL, is two-dimensional or three-dimensional; in particular any combination of 2D or 3D presentations of these elements to be displayed is possible. By displacing his smartphone so that the avatar A is positioned in the link area, the user initiates the insertion of his smartphone into the network. He can thus visually monitor the realisation of this insertion: first the smartphone appears on the screen, then the command of the action is carried out by a simple gesture of the user placing the avatar on the link area. But the invention is not limited to this embodiment. Indeed, it also relates to any type of gesture which the user can apply to his smartphone. As a non-restrictive example, the gesture is the pressing of a dedicated key on the smartphone, a specific movement, for example the gesture of hanging up (by tracing a hook with the hand holding the smartphone), a jolt applied to the smartphone or by bringing the smartphone near to the screen of the network. Thus the link area may or may not be present on the display device.

A system implementing the invention can be realised in the form of software (or computer) modules, or else of a combination of electronic circuits and software modules distributed in the various devices of the network. The system comprises a display device, a mobile device and functional components associated with the display device or in other devices of the network (in the case of a distribution of certain functions such as CPU-intensive object recognition in the network).

The functional components are as follows:
  a smartphone proximity sensor. Various embodiments of the sensor have been described previously. It may be noted that the sensor is by default in standby state, and can be activated by a Wi-Fi detection of the presence of the smartphone or any other low power consumption presence detector. According to a variant, in standby state, the sensor is limited to establishing a depth map of the moving objects placed in front of it and only activates the calculation-intensive object recognition, reconstruction and monitoring functions when an object is detected at a distance less than a determined threshold, for example less than 3 metres.
  an image recognition and processing module whose result is the match between the mobile device and an object from a database. According to a variant, the image processing uses a signature of the image of the front face of the smartphone, for example comprising determined keys, or any other visual characteristics distinguishing different smartphones. Advantageously, once an object is recognised and associated with the smartphone, a graphical representation thereof, called a virtual device or avatar, can be presented on the screen and the calculation of the orientation thereof is possible.
  a module for continuously calculating at least 3 coordinates (X,Y,Z) for the relative position in space of the smartphone with respect to the screen and up to 6 coordinates (X, Y, Z, $\rho$, $\theta$, $\varphi$) when the relative position is supplemented by the relative orientation of the smartphone with respect to the screen for a full mirror effect.
  a module for synthesising the avatar in real time able to reproduce the avatar on the screen with the 6 coordinates by using a 2D or 3D rendering engine. According to different variants the avatar reproduces the original mobile device either realistically or symbolically in the form of an icon. Advantageously, the raw image of the smartphone, that is to say the image directly from the camera, is not rendered on the screen. In fact, this image may be occulted, notably by the hand holding the smartphone.
  a module for image mixing in real time mixing the content previously presented on the screen, the avatar and, if it is visible, a link area.

a module for detecting the avatar on the link area, initiating the action of the logical linking of the smartphone into the home network.

According to an embodiment, the system is capable of distinguishing different types of smartphones and representing them differently on the screen using notably a database referencing the types of smartphone or more generally types of mobile devices.

According to another embodiment, the movement of the avatar is the perfect replica of a mirror effect of the smartphone on the screen, that is to say with the (mirror-image) orientation of the smartphone.

According to another embodiment, the image recognition module is also initiated by other technologies such as wireless proximity detection, for example by the detection by the sensor of the Wi-Fi fields emitted by the mobile device.

According to another embodiment, the link area to be displayed on the screen depends on the representation of the different features which the mobile device can activate for example to a server (to launch a VOD session), a DLNA-compatible content rendering device or the screen itself.

It is also important to note that the invention can be considered from the perspective of a method for inserting a mobile device, able notably to be implemented by means of a network display device AR of the type presented above. The features offered by the implementation of the method according to the invention being identical to those offered by the device D presented above, only the combination of main features offered by the method is presented hereafter.

Figure 3:
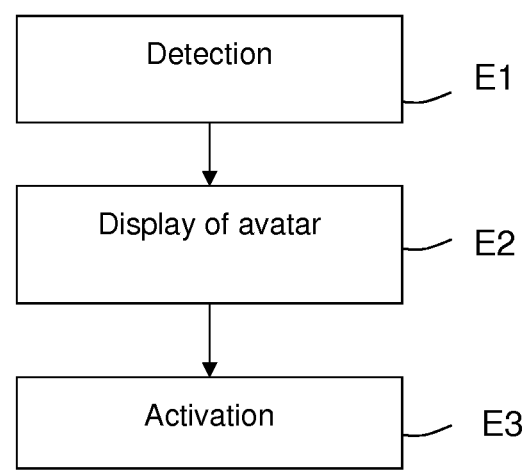
FIG. 3 shows diagrammatically the method for activating a mobile device according to an embodiment of the invention.

FIG. 3 shows diagrammatically the method for inserting a mobile device according to an embodiment of the invention.

In a first step E1, the user brings his smartphone near to the screen for example displaying a video, the smartphone is detected and recognised by the sensor and the screen then presents a graphical representation of the smartphone in avatar form and optionally the link area.

In a second step E2, the user displaces the smartphone and can observe the avatar moving in correspondence with the gesture applied to the smartphone on the screen.

A third step E3 of activating the smartphone in the network, or of activating a function on the network via the smartphone, is initiated by a determined action of the user on the smartphone such as a displacement of the smartphone so that the avatar is positioned in the link area, the pressing of a determined key (for example a key dedicated to the activation) on the smartphone or by a determined action on the smartphone (hook).

Advantageously once the command is entered, the avatar disappears from the screen and the user can put down his smartphone. The method returns to the initial state.

The invention advantageously enables a user to have the feeling that his action is recognised by the network as the action is very intuitive and is reproduced visually as soon as possible, that is to say almost simultaneously. This visual linking does not require a menu, and according to variants does not even require keys; the user simply needs to present his smartphone in front of the screen by displacing it with his hand. The invention therefore has an obvious cognitive simplicity for the user.

It should also be noted that the action of removing the mobile device from the network is advantageously compatible with the invention. Thus to remove the smartphone from the network or to stop an action introduced, the user can, according to different variants, make it reappear on the screen and place it in a removal or release area, or move the smartphone away from the screen.

The invention is not restricted to embodiments of the mobile device, network display device and method for inserting a mobile device described above, provided only as a non-restrictive example, but includes all the variants that can be envisaged by those skilled in the art in the framework of the following claims.

The invention claimed is:

1. A method comprising:
   detecting a physical mobile device via a sensor, the sensor comprising at least one camera, coupled to a display device in a network;
   initiating activation of the sensor from a standby state and an image processing of a picture of the physical mobile device based on a detection of a wireless proximity with the physical mobile device;
   recognizing the detected physical mobile device based on the image processing of the picture of the physical mobile device;
   displaying a virtual device representative of the physical mobile device, the virtual device-being displayed at a first position in an image displayed by the display device, such that the first position of the virtual device in the image is linked to a 3D position of the physical mobile device in a capture field of the sensor, the displayed virtual device moving in the displayed image according to a displacement of the physical mobile device; and
   responsive to detecting movement of the displayed virtual device from the first position to an area of the displayed image designated for activation, activating the physical mobile device in the network.

2. The method according to claim 1,
   wherein a shape is associated with the physical mobile device,
   wherein recognizing the detected physical mobile device comprises an object recognition from shapes, the object recognition being initiated by the detection of the wireless proximity with the physical mobile device, and
   wherein the virtual device is based on the shape.

3. The method according to claim 1,
   wherein the network further comprises at least one second device, and
   wherein activating further comprises an entry of a command on the display device or on at least one second device.

4. The method according to claim 1, further comprising removing the physical mobile device from the network when the displayed virtual device moves in a second area of the image or moves away from the image according to the displacement of the physical mobile device.

5. The method according to claim 1,
   wherein the picture of the physical mobile device is a front face image of the physical mobile device.

6. The method according to claim 1, further comprising locating and orienting the physical mobile device in order to synthetize the virtual device.

7. The method according to claim 1, further comprising determining six coordinates representative of a relative location and a relative orientation of the physical mobile device with respect to the display device for a full mirror effect.

8. The method according to claim 7, wherein an avatar of the physical mobile device is reproduced on the image displayed by the display device based on the six coordinates.

9. A display device coupled to a sensor configured to detect a physical mobile device, the display device comprising:
a processor configured to:
initiate activation of the sensor from a standby state and an image processing of a picture of a physical mobile device detected by the sensor based on a detection of a wireless proximity with the physical mobile device;
recognize the physical mobile device detected by the sensor, the sensor comprising at least one camera, based on the image processing of the picture of the physical mobile device;
display a virtual device representative of the physical mobile device, the virtual device-being displayed at a first position in an image displayed by the display device such that the first position of the virtual device in the image is linked to a 3D position of the physical mobile device in a capture field of the sensor, the displayed virtual device moving in the displayed image according to a displacement of the physical mobile device; and
responsive to detecting movement of the displayed virtual device from the first position to an area of the displayed image designated for activation, activate the physical mobile device in a network.

10. The display device according to claim 9, wherein the display device further comprises the sensor.

11. The display device according to claim 9,
wherein a shape is associated with the physical mobile device, and the processor is further configured to recognize an object from shapes, the object recognition being initiated by the detection of the wireless proximity with the mobile device, and
wherein the virtual device is based on the shape.

12. The display device according to claim 9, wherein the processor is further configured to remove the physical mobile device from the network when the displayed virtual device moves in a second area of the image or moves away from the image according to the displacement of the physical mobile device.

13. The display device according to claim 9,
wherein the picture of the physical mobile device is a front face image of the physical mobile device.

14. The display device according to claim 13, wherein a signature of the front face image of the physical mobile device is used for recognizing the physical mobile device, the signature comprising determined keys or other visual characteristics distinguishing different physical mobile devices.

15. The display device according to claim 9, wherein the processor is further configured to cause the display device to locate and orientate the physical mobile device in order to synthesize the virtual device.

16. The display device according to claim 9, wherein the processor is further configured to cause the display device to determine six coordinates representative of a relative location and a relative orientation of the physical mobile device with respect to the display device for a full mirror effect.

17. The display device according to claim 16, wherein an avatar of the physical mobile device is reproduced on the image displayed by the display device based on the six coordinates.

18. A system comprising:
a display device;
a physical mobile device;
a sensor coupled to the display device and configured to detect the physical mobile device, the sensor comprising at least one camera;
a processor configured to:
initiate activation of the sensor from a standby state and an image processing of a picture of the physical mobile device based on a detection of a wireless proximity with the physical mobile device;
recognize the detected physical mobile device based on the image processing of the picture of the physical mobile device;
display a virtual device representative of the physical mobile device, the virtual device-being displayed at a first position in an image displayed by the display device, such that the first position of the virtual device in the image is linked to a 3D position of the physical mobile device in a capture field of the sensor, the displayed virtual device moving in the displayed image according to a displacement of the physical mobile device; and
responsive to detecting movement of the displayed virtual device from the first position to an area of the displayed image designated for activation, activate the physical mobile device in a network.

19. The system according to claim 18, wherein the display device comprises the processor.

20. The method according to claim 5, wherein recognizing the physical mobile device uses a signature of the front face image of the physical mobile device, the signature comprising determined keys or other visual characteristics distinguishing different physical mobile devices.

* * * * *